(12) United States Patent  (10) Patent No.: US 9,149,926 B2
Chen  (45) Date of Patent: Oct. 6, 2015

(54) COLLAPSIBLE STAND

(75) Inventor: Jung-Huo Chen, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 166 days.

(21) Appl. No.: 13/517,808

(22) Filed: Jun. 14, 2012

(65) Prior Publication Data

US 2012/0318940 A1    Dec. 20, 2012

Related U.S. Application Data (60) Provisional application No. 61/498,086, filed on Jun. 17, 2011.

(51) Int. Cl.
*F16M 11/20* (2006.01)
*B25H 1/04* (2006.01)
*F16M 11/38* (2006.01)

(52) U.S. Cl.
CPC . *B25H 1/04* (2013.01); *F16M 11/38* (2013.01)

(58) Field of Classification Search
USPC .......... 248/164, 436, 439; 108/117, 118, 136, 108/115, 131, 133, 2, 6; 280/30, 652, 35, 280/641; 144/286.1
See application file for complete search history.

(56) References Cited

U.S. PATENT DOCUMENTS

| | | |
|---|---|---|
| 150,354 A | 4/1874 | Quinn |
| 336,156 A | 2/1886 | Pursell, Sr. |
| 1,608,924 A | 11/1926 | Brown |
| 1,703,282 A | 2/1929 | Skinner |
| 2,096,994 A | 10/1937 | Millen |
| 2,318,945 A | 5/1943 | Johannsen |
| 2,372,003 A | 3/1945 | Kennedy |
| 2,609,628 A | 9/1952 | Toth |
| 2,675,635 A | 4/1954 | Toth |
| 2,733,930 A | 2/1956 | Putterman |
| 2,768,866 A | 10/1956 | Amber |
| 2,880,047 A | 3/1959 | Haag |
| 3,655,212 A | 4/1972 | Krass et al. |
| 3,783,799 A | 1/1974 | Dupuis |
| 3,805,710 A | 4/1974 | Leshem |
| 3,930,663 A | 1/1976 | Scripter |
| 4,079,679 A | 3/1978 | Bechtold |
| 4,192,480 A | 3/1980 | Schmidt |
| 4,202,284 A | 5/1980 | Parsons, Sr. |
| 4,248,161 A | 2/1981 | Adair et al. |

(Continued)

FOREIGN PATENT DOCUMENTS

| | | |
|---|---|---|
| CN | 2573185 | 9/2003 |
| DE | 26 45 773 A1 | 4/1978 |

(Continued)

*Primary Examiner* — Joanne Silbermann
(74) *Attorney, Agent, or Firm* — Bacon & Thomas, PLLC (57) ABSTRACT

A collapsible stand includes a base frame, a first supporting frame pivotally connected to the base frame, a first supporting unit pivotally connected between the base frame and the first supporting frame, a second supporting frame pivotally connected to the first supporting frame, a second supporting unit pivotally connected between the base frame and the second supporting frame. When operating the base frame, the second supporting frame is able to be extended away from the first supporting frame, and it is easily operating the collapsible stand from a collapsed position to an extended position; or the second supporting frame is able to be received toward the first supporting frame to a collapsed position by lifting up the first supporting frame.

20 Claims, 7 Drawing Sheets

(56) References Cited

U.S. PATENT DOCUMENTS

| | | |
|---|---|---|
| 4,373,737 A | 2/1983 | Cory et al. |
| 4,483,524 A | 11/1984 | Basten et al. |
| 4,558,648 A | 12/1985 | Franklin et al. |
| 4,561,622 A | 12/1985 | Heinzel |
| 4,586,721 A | 5/1986 | Harada et al. |
| 4,611,823 A | 9/1986 | Haas |
| 4,728,118 A | 3/1988 | Haas |
| 4,967,672 A | 11/1990 | Leather |
| 4,969,496 A | 11/1990 | Romans |
| 5,014,628 A | 5/1991 | Roberts |
| 5,087,013 A | 2/1992 | Gress et al. |
| 5,109,778 A | 5/1992 | Berkowitz et al. |
| 5,323,713 A | 6/1994 | Luyk et al. |
| 5,325,640 A | 7/1994 | Luedke et al. |
| 5,325,794 A | 7/1994 | Hontani |
| 5,421,272 A | 6/1995 | Wilmore |
| 5,454,575 A | 10/1995 | Del Buono |
| 5,484,154 A | 1/1996 | Ward |
| 5,560,582 A * | 10/1996 | Beelen .................. 248/588 |
| 5,603,491 A | 2/1997 | Murrell |
| 5,606,922 A | 3/1997 | Adams et al. |
| 5,638,761 A | 6/1997 | Berkowitz et al. |
| 5,816,374 A | 10/1998 | Hsien |
| 5,862,898 A | 1/1999 | Chang |
| 5,934,641 A | 8/1999 | Vince |
| 6,019,050 A | 2/2000 | Ranta |
| 6,102,369 A | 8/2000 | Monger |
| 6,182,935 B1 | 2/2001 | Talesky |
| 6,360,797 B1 | 3/2002 | Brazell et al. |
| 6,471,220 B1 | 10/2002 | Babb |
| 6,578,856 B2 | 6/2003 | Kahle |
| D486,504 S | 2/2004 | Huang |
| 6,722,293 B2 | 4/2004 | Lee |
| 6,752,091 B2 | 6/2004 | Glover et al. |
| 6,886,836 B1 | 5/2005 | Wise |
| 6,892,860 B2 | 5/2005 | Gibson et al. |
| 6,899,306 B1 | 5/2005 | Huang |
| 6,942,229 B2 | 9/2005 | Brazell et al. |
| D519,747 S | 5/2006 | Wu |
| 7,044,496 B2 | 5/2006 | Holmes |
| D523,041 S | 6/2006 | Wise |
| 7,059,616 B2 | 6/2006 | Wu |
| 7,077,421 B2 | 7/2006 | Wu |
| D527,200 S | 8/2006 | Wu |
| 7,086,632 B2 | 8/2006 | Hsieh |
| D529,252 S | 9/2006 | Wu |
| 7,213,829 B2 | 5/2007 | Wu |
| 7,222,865 B2 | 5/2007 | Chen et al. |
| 7,255,355 B2 | 8/2007 | Chisholm et al. |
| 7,278,646 B2 | 10/2007 | Chuang |
| 7,308,858 B2 | 12/2007 | Lo et al. |
| 7,334,592 B2 | 2/2008 | Tartaglia |
| 7,464,956 B2 | 12/2008 | Chen et al. |
| 7,487,947 B2 | 2/2009 | Liu et al. |
| 7,494,149 B2 | 2/2009 | Liu et al. |
| D594,042 S | 6/2009 | Wise |
| 7,681,893 B2 | 3/2010 | Liu et al. |
| 7,690,408 B2 * | 4/2010 | Sugiura .................. 144/286.5 |
| 7,882,870 B2 | 2/2011 | Lee |
| 8,096,519 B2 | 1/2012 | Tam et al. |
| 8,517,413 B2 * | 8/2013 | Chen .................. 280/651 |
| 2004/0070179 A1 * | 4/2004 | Miller et al. .................. 280/651 |
| 2005/0011421 A1 | 1/2005 | Zhang |
| 2005/0045781 A1 | 3/2005 | Brazell |
| 2005/0120849 A1 | 6/2005 | Lee |
| 2005/0120922 A1 | 6/2005 | Brooks |
| 2005/0133682 A1 | 6/2005 | Huang |
| 2005/0183559 A1 | 8/2005 | Rue |
| 2005/0194215 A1 | 9/2005 | Radermacher |
| 2005/0199768 A1 | 9/2005 | Tam et al. |
| 2006/0011191 A1 | 1/2006 | Vavricek |
| 2006/0021552 A1 | 2/2006 | Pleiman et al. |
| 2006/0021553 A1 | 2/2006 | Pleiman et al. |
| 2006/0038383 A1 | 2/2006 | Wu |
| 2006/0049614 A1 | 3/2006 | Shamah |
| 2006/0071450 A1 | 4/2006 | Wu |
| 2006/0075943 A1 | 4/2006 | Chen et al. |
| 2006/0076756 A1 * | 4/2006 | Wu .................. 280/652 |
| 2006/0145045 A1 * | 7/2006 | Chisholm et al. .................. 248/439 |
| 2007/0080488 A1 | 4/2007 | Chuang |
| 2007/0102892 A1 | 5/2007 | Chiu |
| 2008/0115701 A1 | 5/2008 | Sugiura |
| 2008/0257225 A1 | 10/2008 | Chianale |
| 2010/0096530 A1 * | 4/2010 | Chiu .................. 248/439 |
| 2012/0313351 A1 | 12/2012 | Chen |

FOREIGN PATENT DOCUMENTS

| | | |
|---|---|---|
| EP | 0 532 132 A2 | 3/1993 |
| GB | 2 363 366 A | 12/2001 |
| WO | WO 03064115 A1 | 8/2003 |

\* cited by examiner

COLLAPSIBLE STAND

CROSS-REFERENCE TO RELATED APPLICATION

This application claims the benefit of priority from U.S. provisional application No. 61/498,086, filed on Jun. 17, 2011, the entirety of which is incorporated herein by reference.

FIELD OF THE INVENTION

The present disclosure relates to a stand for supporting a machine tool thereon and more specifically, to a collapsible stand for supporting machine tools.

BACKGROUND

For providing portability to conventional machine tools/power tools (i.e. table saws), conventional stands for supporting said machine tools are often provided with a collapsible structure for allowing the machine tools to be conveniently transported and used in a variety of different work sites.

U.S. Pat. Nos. 6,942,229, 5,560,582, and U.S. Patent Application Publication No. 2005/0199768A1 disclosed various collapsible stands. Additionally, the Applicant's prior Taiwan Invention Patent No. 1311520 disclosed a Supporting Stand for Machine Tools which includes a supporting platform adapted to support a machine tool, a pair of first legs pivotally disposed on one lateral side of the supporting platform, a pair of second legs pivotally disposed on another lateral side of the supporting platform and each of the second legs has one end pivotally and respectively connected with the first legs, a pair of resilient members respectively sleeved on the second legs; and a securing unit. The securing unit includes a handle slidably disposed on the supporting platform, two link members pivotally connected with the handle, two coupling members pivotally and respectively connected to the two link members, and two spring members disposed between the two coupling members and the supporting platform respectively. When the supporting stand is in an extended position, pulling the handle will drive the link members to pivotally rotate, the two link members will drive the coupling members to linearly approach each other, such that end tips of the link members are disengaged from the second legs for allowing the second legs to slide along a pair of sleeve members respectively such that the supporting stand is folded.

The aforementioned supporting stands are able to support the machine tool, and can be easily extended and can be easily stored when not in use. Therefore, in view of the functionality and increasing demands for the supporting stands, the present disclosure has arisen.

SUMMARY

The present disclosure has been accomplished under the circumstances in view. It is therefore the main object of the present disclosure to provide a collapsible stand, which has a simple structure, is easy to operate, and can be quickly folded/extended.

To achieve these and other objects of the present disclosure, the collapsible stand in accordance with the present disclosure comprises a base frame which is adapted for supporting a machine tool. The base frame has a first lateral portion and a second lateral portion which are respectively located on two opposite sides thereof. A handle is mounted on the first lateral portion of the base frame. A first supporting frame includes two first legs which are pivotally engaged with the first lateral portion of the base frame and a bottom bracket which is disposed between the two first legs. Each first leg includes a main shaft which engages with the bottom bracket and a sliding shaft which has two opposite ends slidably engaging with the main shaft and pivotally connecting with the first lateral portion respectively. Each of the main shafts has a bending portion formed thereon and adapted to for corresponding to a ground surface. The bending portion is located between the first leg and the bottom bracket. Two pin members are respectively mounted on the bending portions. The first legs are perpendicularly arranged relative to the bottom bracket. A first supporting unit is pivotally disposed between the second lateral portion of the base frame and the first supporting frame. The first supporting frame includes two pairs of pivoting plates which are respectively mounted on the two first legs. Each pivoting plate has a substantially plate-shaped positioning member fixedly disposed thereon. A second supporting frame includes two second legs pivotally and respectively engaging with the first legs. Each second leg has an end section formed on one end thereof and oppositely corresponds to the bottom bracket of the first supporting frame. Two wheels are respectively and pivotally disposed on the end sections. Each second leg has an axial portion respectively formed thereon. The axial portion is located on an opposite end relative to the end section. The axial portion pivotally engages with the pivoting plates. A second supporting unit which is adapted for positioning the second supporting frame relative to the first supporting frame is pivotally disposed between the first lateral portion of the base frame and the second legs of the second supporting frame. An operating unit is mounted on the first supporting frame. The operating unit includes a driving shaft, a push lever, a coupling member, and a spring member. The driving shaft has a pedaling portion and a pivoting portion respectively formed on two opposite ends thereof. The pivoting portion pivotally engages with the first supporting frame such that the driving shaft is pivotable relative to the first supporting frame. The push lever has a first end which is pivotally engaged with one of the first legs of the first supporting frame and a second end for corresponding to the base frame. The push lever has a pawl surface which extends from the second end toward the first end thereof. A roller is disposed on the first end of the push lever. The second supporting frame has a guiding shaft disposed thereon for corresponding to the roller. The first supporting unit has a guiding wheel disposed thereon for corresponding to the pawl surface. The push lever having a spaced distance relative to the driving shaft. The coupling member is pivotally disposed between the driving shaft and the push lever. The coupling member has a first pivoting section and a second pivoting section formed on two opposite ends thereof. The first pivoting section and the second pivoting section are respectively and pivotally engaging with the push lever and the driving shaft. The operating unit further includes a spring member which has two ends respectively abutting against the pedaling portion of the driving shaft and the first end of the push lever. A resilient force of the spring member constantly biases the pedaling portion and the first end to orient toward each other.

In an extended configuration, the first supporting frame and the second supporting frame are outwardly extending away from each other such that the bottom bracket of the first supporting frame and the end sections of the second supporting frame are located at their farthest distance apart. The second supporting unit securely positioned the second supporting frame relative to the first supporting frame.

In a folded configuration, the first supporting frame and the second supporting frame are oriented toward each other in a substantially parallely arranged manner; the base frame is arranged in a substantially upright manner such that the second lateral portion of the base frame is located adjacent to the first supporting frame.

The present disclosure can achieve the following effects: by utilizing the first supporting unit and the second supporting unit, the first supporting frame and the second supporting frame are outwardly extended relative to the first supporting frame such that the are the first supporting frame and the second supporting frame are positioned outwardly away from each other for extending the collapsible stand. By lifting the first supporting frame, the second supporting frame is retractedly movable toward the first supporting frame, such that the collapsible stand can be easily folded. Thereby, the collapsible stand in accordance with the present disclosure can be easily and quickly folded/extended.

DETAILED DESCRIPTION OF THE PREFERRED EMBODIMENT

Figure 1:
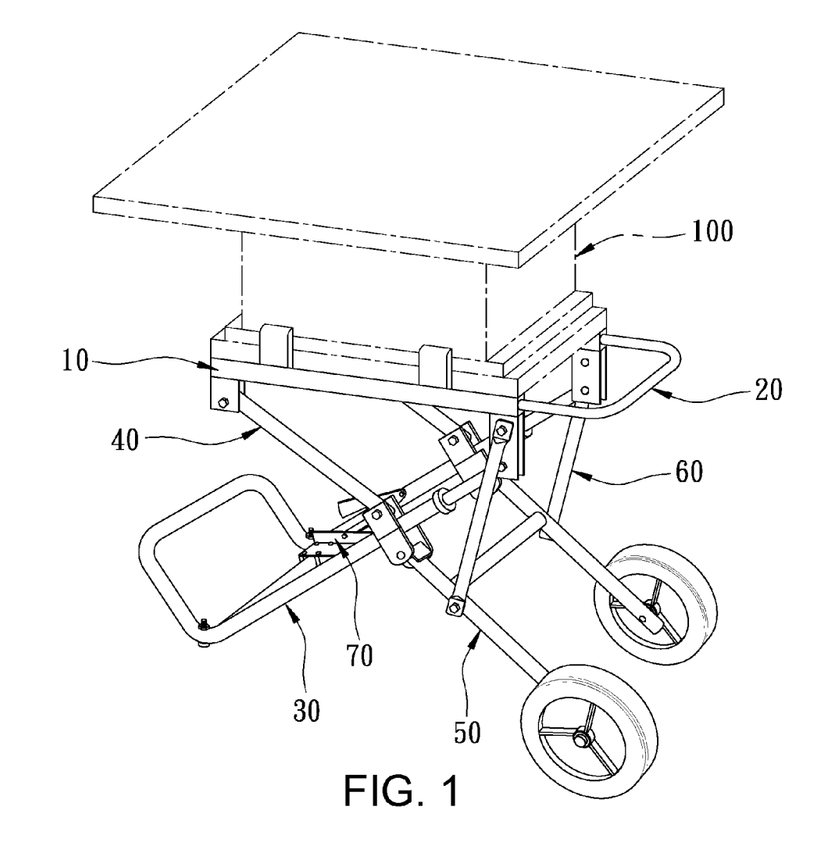
FIG. 1 is a perspective view of a collapsible stand in accordance with a preferred embodiment of the present disclosure.
Figure 2:
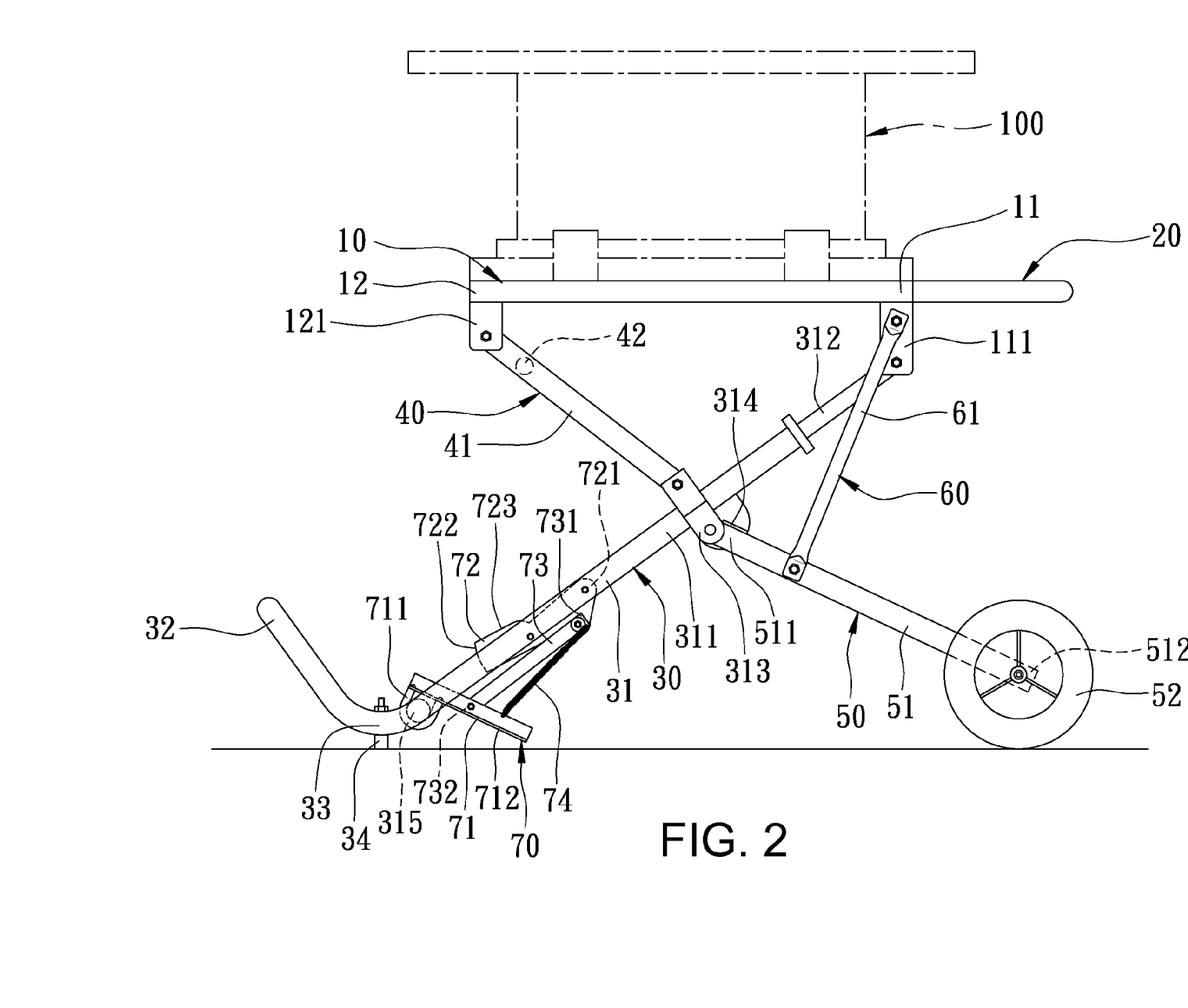
FIG. 2 is an assembled side view of the collapsible stand in accordance with the preferred embodiment of the present disclosure, wherein the collapsible stand is in an extended configuration.

An embodiment of a collapsible stand according to the present disclosure is shown in FIGS. 1-2, the collapsible stand includes a base frame 10 which is adapted for supporting a machine tool 100. The base frame 10 is substantially rectangular. The base frame 10 has a first lateral portion 11 and a second lateral portion 12 which are respectively located on two opposite sides thereof. A pair of first pivot ears 111 is mounted on the first lateral portion 11 and downwardly extending from a bottom surface thereof. A pair of second pivot ears 121 is mounted on the second lateral portion 12 and downwardly extending from a bottom surface thereof. A handle 20 is mounted on the first lateral portion 11 of the base frame 10. The handle 20 is substantially U-shaped for providing an ergonomic gripping purpose.

A first supporting frame 30 includes two first legs 31 and a bottom bracket 32. The two first legs 31 are pivotally engaged with the first pivot ears 111 of the first lateral portion 11. The bottom bracket 32 is disposed between the two first legs 31. Each first leg 31 includes a main shaft 311 which engages with the bottom bracket 32 and a sliding shaft 312 which has two opposite ends slidably engaging with the main shaft 311 and pivotally connecting with the first pivot ears 111 respectively such that the sliding shaft 312 is telescopically slidable relative to the main shaft 311. Each main shaft 311 has a bending portion 33 formed thereon for corresponding to a ground surface. The bending portion 33 is substantially arc-shape and is located between the bottom bracket 32 and the main shaft 311 of the first leg 31. Two pin members 34 are respectively mounted on the bending portions 33. A pivoting rod 315 is disposed between the first legs 31 and is located adjacent to the bending portions 33. The first legs 31 are perpendicularly arranged relative to the bottom bracket 32 such that the first legs 31 and the bottom bracket 32 configured a L-shape. Two pairs of pivoting plates 313 are respectively mounted on the two first legs 31 and are intermediately located on the main shaft 311. Each pivoting plate 313 has a substantially plate-shaped positioning member 314 fixedly disposed thereon.

A first supporting unit 40 is pivotally disposed between the second lateral portion 12 of the base frame 10 and the first supporting frame 30. The first supporting unit 40 includes a pair of supporting shafts 41. Each supporting shaft 41 has two ends respectively and pivotally engaging with the second pivot ears 121 of the second lateral portion 12 and the main shaft 311 of the first supporting frame 30. A guiding wheel 42 is disposed on one of the supporting shafts 41.

A second supporting frame 50 includes two second legs 51 pivotally and respectively engaging with the pivoting plates 313 of the first legs 31 of the first supporting frame 30. Each second leg 51 has an end section 512 formed on one end thereof and oppositely corresponds to the bottom bracket 32 of the first supporting frame 30. Each second leg 51 has an axial portion 511 formed thereon which is located on an opposite end relative to the end section 512. Each axial portion 511 pivotally engages with the corresponding pivoting plate 313 of the first supporting frame 30. A guiding shaft 53 is axially disposed on one of the second legs 51. Two wheels 52 are respectively and pivotally disposed on the end sections 512 of the second legs 51.

A second supporting unit 60 which is adapted for positioning the second supporting frame 50 relative to the first supporting frame 30 is pivotally disposed between the first lateral portion 11 of the base frame 10 and the second legs 51 of the second supporting frame 50. The second supporting unit 60 includes a pair of supporting members 61, each supporting member 61 has two ends respectively and pivotally engaging with the corresponding first pivot ear 111 of the first lateral portion 11 and the second leg 51 of the second supporting frame 50.

An operating unit 70 is mounted on the first supporting frame 30. The operating unit 70 includes a driving shaft 71, a push lever 72, a coupling member 73, and a spring member 74. The driving shaft 71 has a pedaling portion 712 and a pivoting portion 711 respectively formed on two opposite ends thereof. The pivoting portion 711 is pivotally engaged with the pivoting rod 315 of the first supporting frame 30 such that the driving shaft 71 is pivotable relative to the first supporting frame 30. The push lever 72 has a first end 721 which is pivotally engaged with one of the first legs 31 of the first supporting frame 30 and a second end 722 for corresponding to the base frame 10. The push lever 72 has a pawl surface 7 which extends from the second end 722 toward the first end 721 thereof. The pawl surface 723 corresponds to the guiding wheel 42 of the first supporting unit 40. A roller is disposed on the first end 721 of the push lever 72 for corresponding to the guiding shaft 53 of the second supporting frame 50. The push lever 72 has a spaced distance from the driving shaft 71 such that that push lever 72 is not interfered by the driving shaft 71 during operation and vice versa. The coupling member 73 is pivotally disposed between the driving shaft 71 and the push lever 72. The coupling member 73 has a first pivoting section 731 and a second pivoting section 732 formed on two opposite ends thereof. The first pivoting section 731 and the second pivoting section 732 are respectively and pivotally engaging with the push lever 72 and the driving shaft 71. The first pivoting section 731 is pivotally connected to the first end 721 of the push lever 72 whereas the second pivoting section 732 is located between the pivoting portion 711 and the pedaling portion 712 of the driving shaft 71. The spring member 74 has two ends respectively abutting against the pedaling portion 712 of the driving shaft 71 and the first end 721 of the push lever 72. A resilient force of the spring member 74 constantly biases the pedaling portion 712 and the first end 721 to orient toward each other.

As shown in FIG. 2, when the collapsible stand in accordance with the present invention is in an extended configuration, the first supporting frame 30 and the second supporting frame 50 are positioned outwardly away from each other such that the bottom bracket 32 of the first supporting frame 30 and the end sections 512 of the second supporting frame 50 are located at their farthest distance apart. The first supporting frame 30 and the second supporting frame 50 are tiltedly positioned on the ground surface for stably supporting the base frame 10. The base frame 10 is substantially in a horizontal position relative to the ground surface. By securely position the axial portions 511 of the second legs 51 on the corresponding positioning members 314, the first supporting frame 30 and the second supporting frame 50 are retained tiltedly positioned relative to the ground surface such that the collapsible stand is stably maintained in the extended configuration. The pin members 34 rest on the ground surface for ensuring the collapsible stand is stably positioned.

When an user wishes to transport the machine tool 100 from one location to another, he/she simply needs to exert a downward force to the handle 20, such that the pin members 34 mounted on the bending portions 33 are lifted from the ground surface, thereby the user can easily transport the machine tool 100 via the wheels 52 on the second supporting frame 50.

Figure 3:
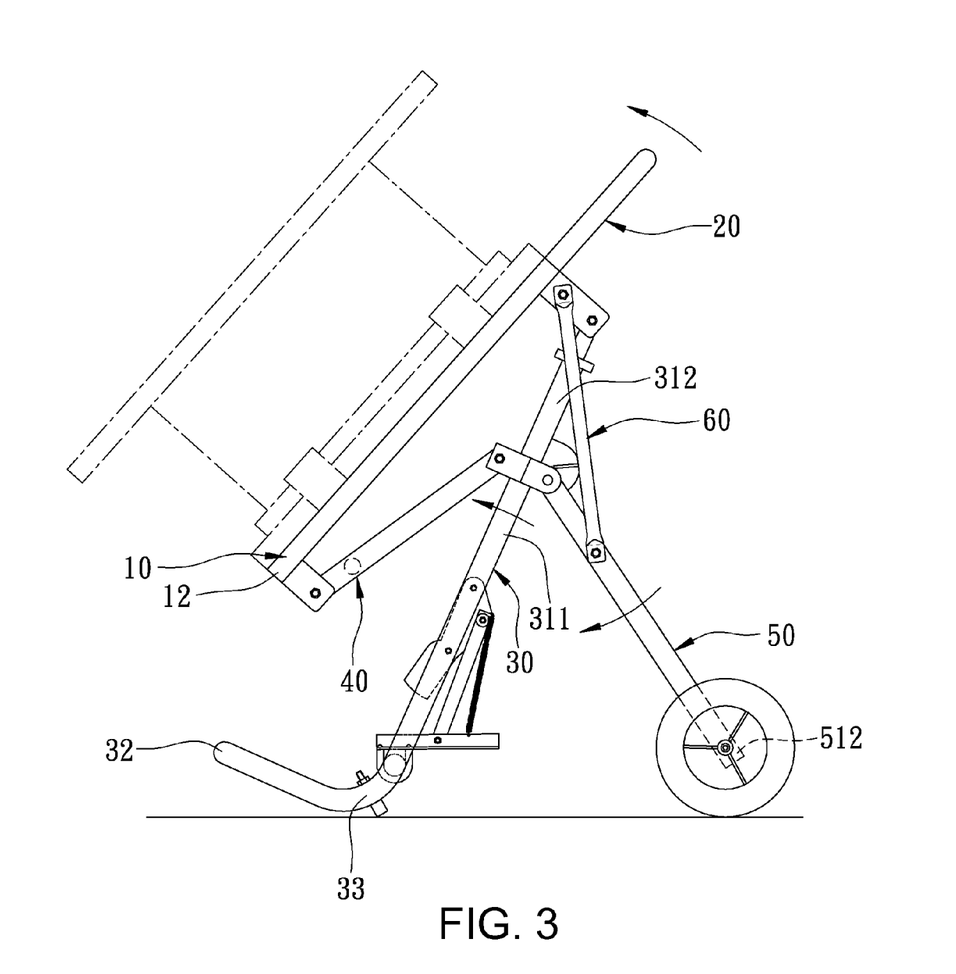
FIG. 3 is a side view of the collapsible stand in accordance with the preferred embodiment of the present disclosure, wherein the collapsible stand is operated to covert from the extended configuration to a folded configuration.
Figure 4:
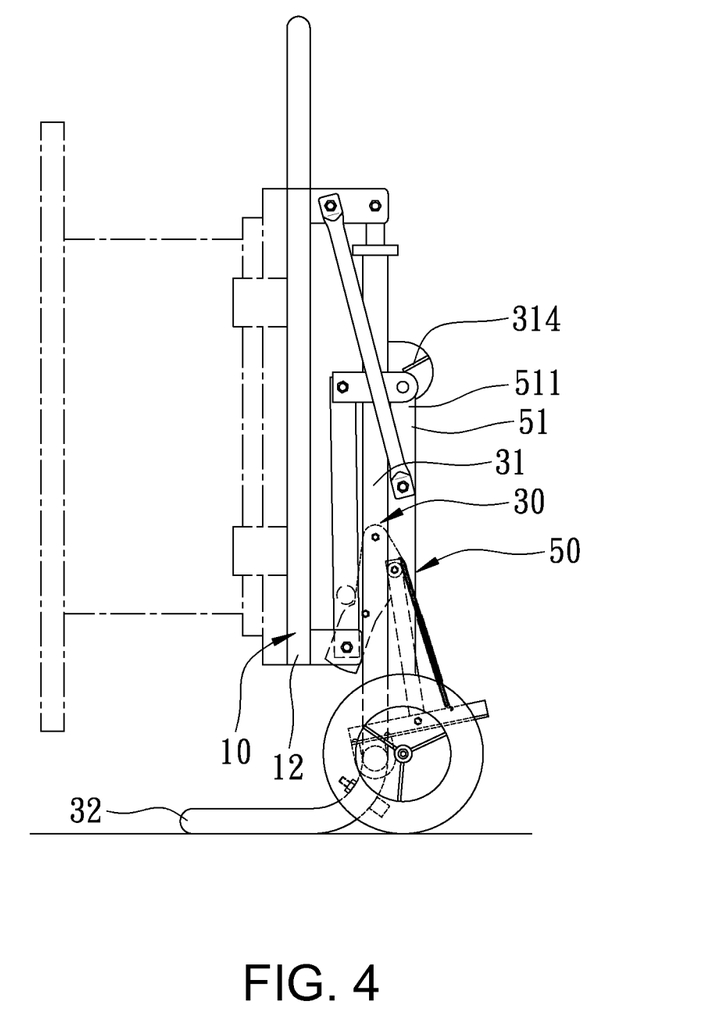
FIG. 4 is a side view of the collapsible stand in accordance with the preferred embodiment of the present disclosure, wherein the collapsible stand is in the folded configuration.
Figure 5:
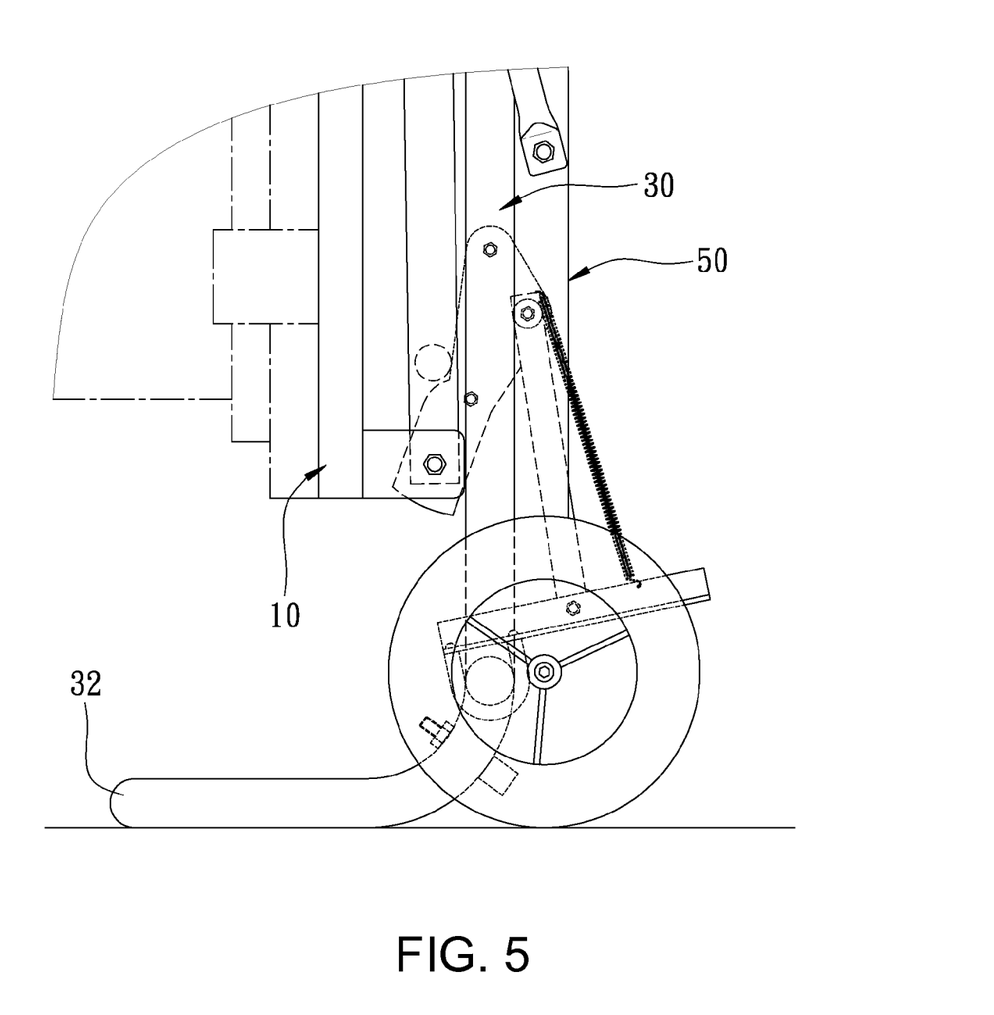
FIG. 5 is a partial enlarged view of FIG. 4.

Further referring to FIGS. 3-5, in order to convert the collapsible stand in accordance with the present invention from the extended configuration to a folded configuration, the user simply lifts up the handle 20 such that the first lateral portion 11 is lifted and the first supporting frame 30 is driven to pivotally retract. The second supporting frame 50, driven by the movement of the first supporting frame 30, is likewise pivotally retracted toward the first supporting frame 30. The first supporting frame 30 and the second supporting frame 50 are brought closer together until the first supporting frame 30 and the second supporting frame 50 are uprightly positioned relative to the ground surface and are substantially parallely arranged relative to each other. The sliding shafts 312 thereby telescopically slide into the main shafts 311. The second supporting unit 60 is driven by movement of the second supporting frame 50 such that the supporting members 61 of the second supporting unit 60 jostle the first lateral portion 11 of the base frame 10. The base frame 10 is therefore pivotally tilted from the horizontal position to a fully upright position with the second lateral portion 12 orienting toward the ground surface and closely located adjacent to the first supporting frame 30. The bottom bracket 32 and the end sections 512 which are located at their farthest distance apart in the extended configuration are drawn toward each other and are closely located adjacent to each other in the folded configuration.

As shown in FIGS. 4 and 5, when the collapsible stand in accordance with the present invention is fully folded, it is reduced to a compact size for convenient storage. Furthermore, the bottom bracket 32 of the first supporting frame 30 rests on the ground surface for stably supporting the collapsible stand in the folded configuration.

Figure 6:
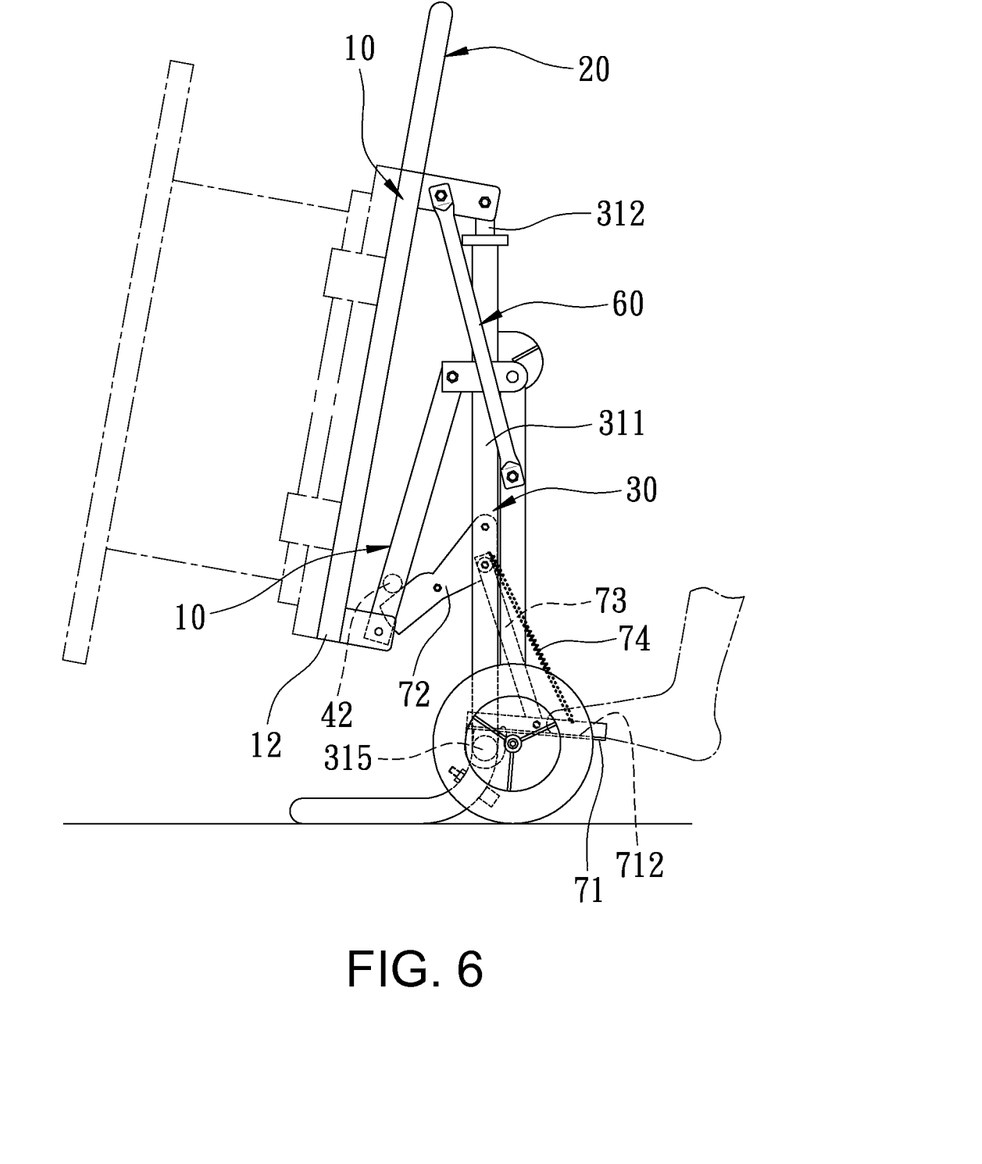
FIG. 6 is a side view of the collapsible stand in accordance with the preferred embodiment of the present disclosure, wherein the collapsible stand is operated to convert from the folded configuration to the extended configuration.
Figure 7:
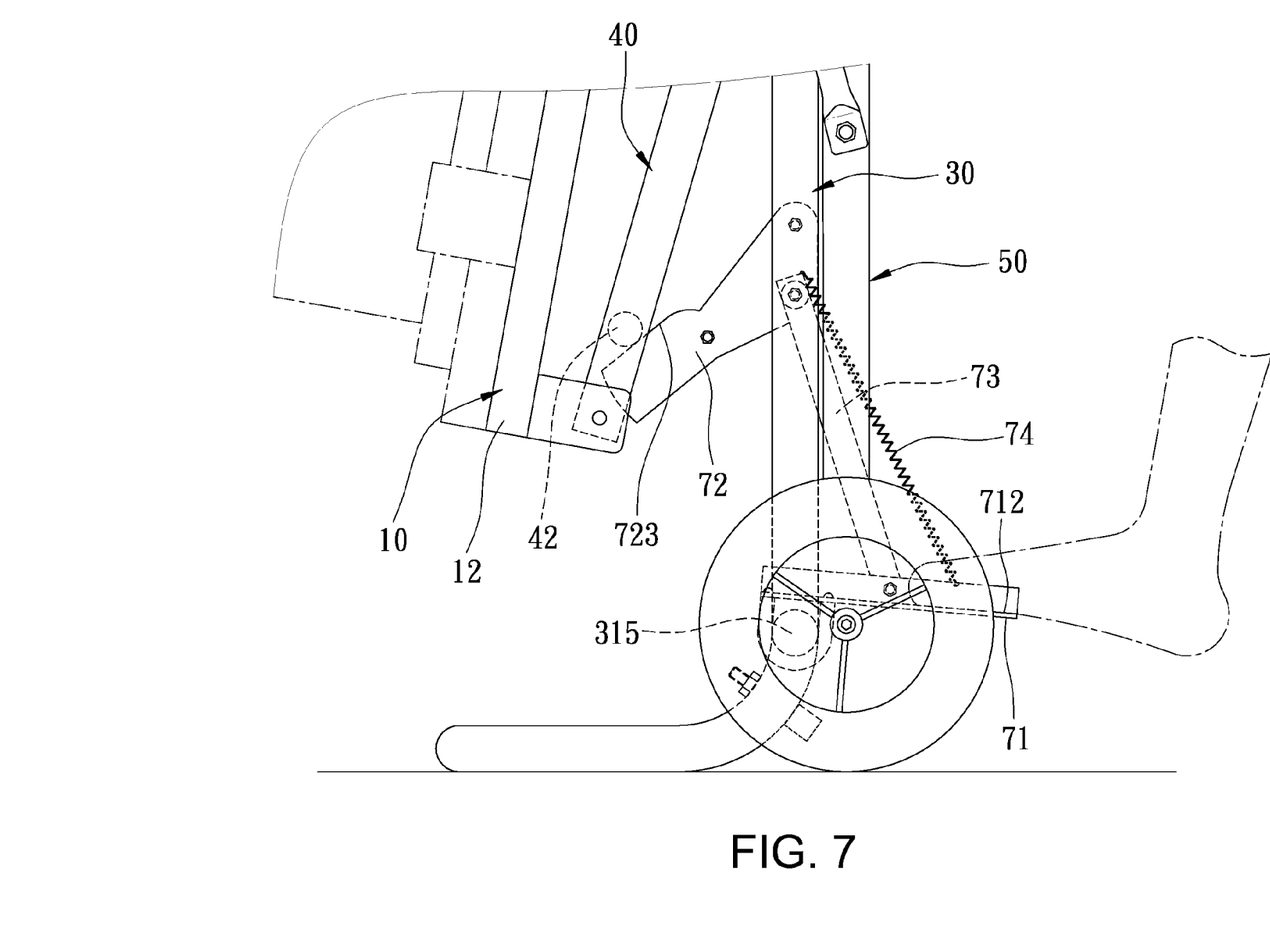
FIG. 7 is a partial enlarged view of FIG. 6.

Further referring to FIGS. 6 and 7, when the user intends to convert the collapsible stand in accordance with the present invention from the folded configuration to the extended configuration shown in FIGS. 1 and 2, the user pedals on the pedaling portion 712 of the driving shaft 71 such that the driving shaft 71 is pivotally rotated to drive the coupling member 73 for pivotally driving the push lever 72 (When the pedaling portion is pedaled, the spring member 74 is expanded to store resilient force for elastic discovery). The pawl surface 723 is thereby by urged into engagement with the guiding wheel 42 disposed on the supporting shaft 41. The guiding wheel 42 glides along the pawl surface 723 to drive the first supporting unit 40 and the base frame 10 upwardly away from the first supporting frame 30. The sliding shafts 312 telescopically and slidably extends from the main shafts 311. Simultaneously, the roller 724 disposed on the first end 721 of the push lever 72 glides along the guiding shaft 53 for driving the second supporting frame 50 to pivotally and radially extending outward and away from the first supporting frame 30. The base frame 10 is therefore driven by the first supporting unit 40 to return to the horizontal position relative to the ground surface as shown in FIGS. 1 and 2. The second supporting unit 60 is pivotally driven by the base frame 10 and the second supporting frame 50 such that the supporting members 61 of the second supporting unit 60 are pivotally and appropriately rotated for positioning the second supporting frame 50. By continuously exerting downward force on the handle 20, the first supporting frame 30 and the second supporting frame 50 continue to move outwardly away from each other until the bottom bracket 32 of the first supporting frame 30 and the end sections 512 of the second supporting frame 50 are located at their farthest distance apart as in the extended configuration shown in FIGS. 1 and 2.

When the pedaling portion 712 is released, the spring member 74 elastically recovers such that the driving shaft 71, the push lever 72, and the coupling member 73 are driven to return to their original positions as shown in FIGS. 4 and 5.

In view of the above, the collapsible stand in accordance with the present invention is easy to operate, and can be folded/extended quickly.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A collapsible stand comprising:
 a base frame adapted for supporting a machine tool, the base frame having a first lateral portion and a second lateral portion located on two opposite sides of the base frame;
 a first supporting frame including first and second first legs pivotally engaging with a pair of first pivot ears mounted on the first lateral portion of the base frame and a bottom bracket disposed between the two first legs; each first leg including a main shaft engaging with the bottom bracket and a sliding shaft having a first end slidably engaging with the main shaft and a second end pivotally connecting with the first pivot ears;
 a first supporting unit pivotally disposed between the second lateral portion of the base frame and the first supporting frame;

a second supporting frame including first and second second legs pivotally coupled with the first legs; each second leg having an end section formed on one end thereof and oppositely corresponding to the bottom bracket of the first supporting frame; and
a second supporting unit adapted for positioning the second supporting frame relative to the first supporting frame and pivotally disposed between the first lateral portion of the base frame and the second legs of the second supporting frame, such that the second supporting unit is pivotally connected with the first pivot ears;
wherein, in an extended configuration, the first supporting frame and the second supporting frame are positioned outwardly away from each other such that the bottom bracket of the first supporting frame and the end sections of the second supporting frame are located at their farthest distance apart, the second supporting unit securely positioned the second supporting frame relative to the first supporting frame;
wherein, in a folded configuration, the first supporting frame and the second supporting frame are substantially parallel to each other; the base frame is arranged in a substantially upright manner such that the second lateral portion of the base frame is located adjacent to the first supporting frame.

2. A collapsible stand according to claim 1, further comprising:
an operating unit mounted on the first supporting frame, the operating unit including a driving shaft, the driving shaft having a pedaling portion and a pivoting portion formed on two opposite ends of the driving shaft, the pivoting portion pivotally engaging with the first supporting frame such that the driving shaft is pivotable relative to the first supporting frame;
a push lever having a first end pivotally engaged with one of the first legs of the first supporting frame and a second end for corresponding to the base frame, the push lever having a spaced distance from the driving shaft; and
a coupling member pivotally disposed between the driving shaft and the push lever, the coupling member having a first pivoting section and a second pivoting section formed on two opposite ends of the coupling member, the first pivoting section pivotally engaging with the push lever and the second pivoting section pivotally engaging with the driving shaft,
wherein, in the folded configuration, by applying a pedal force on the pedaling portion, the coupling member is driven by the driving shaft to drive the push lever such that the second end of the push lever urges the second lateral portion of the base frame to drive the second lateral portion away from the first supporting frame.

3. A collapsible stand according to claim 2, wherein the operating unit includes a spring member which has a first end abutting against the pedaling portion of the driving shaft and a second end abutting against the first end of the push lever; a resilient force of the spring member constantly biasing the pedaling portion and the first end to orient toward each other.

4. A collapsible stand according to claim 3, wherein the push lever having a pawl surface extending from the second end toward the first end of the push lever, a roller disposed on the second end of the push lever;
the second supporting frame has a guiding shaft disposed thereon for corresponding to the roller;
the first supporting unit having a guiding wheel disposed thereon for corresponding to the pawl surface;
wherein, in the folded configuration, by operating the driving shaft, the push lever is driven to pivotally rotate via the coupling member such that the pawl surface is urged into engagement with the guiding wheel, the guiding wheel glides along the pawl surface to drive the first supporting unit and the base frame upwardly away from the first supporting frame to drive the first supporting unit and the base frame upwardly away from the first supporting frame;
whereas, the roller glides along the guiding shaft for driving the second supporting frame to pivotally and radially extending outward and away from the first supporting frame.

5. A collapsible stand according to claim 1, further comprising:
two wheels respectively and pivotally disposed on the end sections of the second leg members.

6. A collapsible stand according to claim 5, wherein each first leg of the first supporting frame has a bending portion formed thereon and located between the first leg and the bottom bracket adapted for corresponding to a ground surface in the extended configuration; the first legs being perpendicularly arranged relative to the bottom bracket.

7. A collapsible stand according to claim 6, further comprising:
a pin member mounted on the bending portion of each of the first legs of the first supporting frame.

8. A collapsible stand according to claim 1, wherein the first supporting frame includes at least one pivoting plate mounted on each of the first legs, each pivoting plate having a substantially plate-shaped positioning member fixedly disposed thereon; each second leg having an axial portion formed thereon for corresponding to the pivoting plate, the axial portions selectively engaging with the pivoting plates; wherein, in the extended configuration, the axial portions are securely positioned on the positioning members; wherein, in the folded configuration, the axial portions are disengaged from the positioning members.

9. A collapsible stand according to claim 1, further comprising: a handle mounted on the first lateral portion of the base frame.

10. A collapsible stand comprising:
a base frame having a first lateral portion located on a first side of the collapsible stand and a second lateral portion located on a second side of the collapsible stand opposite the first side;
a first supporting frame including first and second first legs pivotally connected with a pair of first pivot ears mounted on the first lateral portion of the base frame; each first leg including a main shaft and a sliding shaft having a first end slidably engaging with the main shaft and a second end pivotally connecting with the first pivot ears;
a first supporting unit disposed between the second lateral portion and the first supporting frame, the first supporting unit having a first end pivotally connected to the second lateral portion of the base frame and a second end pivotally connected at a first connection point;
a second supporting frame including first and second second legs; each second leg pivotally connected around the first connection point and pivotable relative to the first legs; and
a second supporting unit pivotally connected to the first pivot ears mounted on the first lateral portion of the base frame and to the second legs of the second supporting frame.

11. The collapsible stand according to claim 10, wherein the collapsible stand has two configurations.

12. The collapsible stand according to claim 11, wherein, in an extended configuration, the first supporting frame and the second supporting frame are positioned outwardly away from each other such that the bottom of the first supporting frame and the end sections of the second supporting frame are located at their farthest distance apart, the second supporting unit securely positioned the second supporting frame relative to the first supporting frame.

13. The collapsible stand according to claim 11, wherein, in a folded configuration, the first supporting frame and the second supporting frame are substantially parallel to each other; and the base frame is arranged in a substantially upright manner such that the second lateral portion of the base frame is located adjacent to the first supporting frame.

14. The collapsible stand according to claim 10, further comprising an operating unit mounted on the first supporting frame, the operating unit including a driving shaft, the driving shaft having a pedaling portion and a pivoting portion formed on two opposite ends of the driving shaft, the pivoting portion pivotally engaging with the first supporting frame such that the driving shaft is pivotable relative to the first supporting frame;
- a push lever having a first end pivotally engaged with one of the first legs of the first supporting frame and a second end; and
- a coupling member pivotally disposed between the driving shaft and the push lever, the coupling member having a first pivoting section and a second pivoting section formed on two opposite ends of the coupling member, the first pivoting section pivotally engaging with the push lever and the second pivoting section pivotally engaging with the driving shaft,
- wherein, in a folded configuration, by applying a pedal force on the pedaling portion, the coupling member is driven by the driving shaft to drive the push lever such that the second end of the push lever urges the second lateral portion of the base frame away from the first supporting frame.

15. The collapsible stand according to claim 10, wherein the bottom of the first supporting frame includes a bottom bracket between the first and second first legs and each first leg of the first supporting frame has a bending portion, the bending portion corresponding to a ground surface in an extended configuration.

16. A collapsible stand comprising:
- a base frame having a first lateral portion located on a first side of the collapsible stand and a second lateral portion located on a second side of the collapsible stand opposite the first side;
- a first supporting frame including at least one first leg pivotally connected with a pair of first pivot ears mounted on the first portion of the base frame; the at least one first leg including a main shaft and a sliding shaft having a first end slidably engaging with the main shaft and a second end pivotally connecting with the first pivot ears;
- a first supporting unit between the second lateral portion and the first supporting frame, the first supporting unit having a first end pivotally connected to the second lateral portion of the base frame and a second end pivotally connected at a first connection point;
- a second supporting frame including at least one second leg; the at least one second leg pivotally connected around the first connection point and pivotable relative to the at least one first leg; and
- a second supporting unit pivotally connected to the first pivot ears mounted on the first lateral portion of the base frame and to the at least one second leg of the second supporting frame.

17. The collapsible stand according to claim 16, wherein the collapsible stand has two configurations.

18. The collapsible stand according to claim 17, wherein, in an extended configuration, the first supporting frame and the second supporting frame are positioned outwardly away from each other such that the bottom of the first supporting frame and the end sections of the second supporting frame are located at their farthest distance apart, the second supporting unit securely positioned the second supporting frame relative to the first supporting frame.

19. The collapsible stand according to claim 17, wherein, in a folded configuration, the first supporting frame and the second supporting frame are substantially parallel to each other; the base frame is arranged in a substantially upright manner such that the second lateral portion of the base frame is located adjacent to the first supporting frame.

20. The collapsible stand according to claim 16, further comprising:
- an operating unit mounted on the first supporting frame, the operating unit including a driving shaft, the driving shaft having a pedaling portion and a pivoting portion formed on two opposite ends of the driving shaft;
- a push lever having a first end pivotally engaged with a first leg of the first supporting frame and a second end;
- wherein, in the folded configuration, by applying a pedal force on the pedaling portion, the second end of the push lever urges the second lateral portion of the base frame away from the first supporting frame.

* * * * *